United States Patent [19]

Siegfried, II

[11] 4,452,077

[45] Jun. 5, 1984

[54] BOREHOLE ULTRASONIC FLOW METER

[75] Inventor: Robert W. Siegfried, II, Frisco, Tex.

[73] Assignee: Atlantic Richfield Company, Los Angeles, Calif.

[21] Appl. No.: 399,548

[22] Filed: Jul. 19, 1982

[51] Int. Cl.³ .............................................. E21B 47/10
[52] U.S. Cl. .................................... 73/155; 73/861.31
[58] Field of Search ................. 73/155, 861.31, 861.27

[56] References Cited

U.S. PATENT DOCUMENTS 3,336,801 8/1967 Snavely ........................ 73/861.27 X
3,934,467 1/1976 Nicolas .................................. 73/155

Primary Examiner—Jerry W. Myracle
Attorney, Agent, or Firm—Robert M. Betz

[57] ABSTRACT

A borehole tool incorporates an ultrasonic flow measuring device which enables calculation of the rate of flow of material through various perforated intervals of a well casing as a function of depth. Fluid flow rate is proportional to the difference in travel time of a pulse-type ultrasonic signal over a fixed distance in opposite directions through the fluid.

6 Claims, 2 Drawing Figures

BOREHOLE ULTRASONIC FLOW METER

BACKGROUND OF THE INVENTION

1. Field of the Invention

This invention relates generally to the measurement of the rate of fluid flow in a well and, more particularly, to determination, by ultrasonic means, of the rate of flow through various perforated intervals of a well casing.

2. Description of the Prior Art

In order to determine the rates of flow through various perforated intervals of a well, the rate of flow of material through the well casing is measured as a function of depth. Changes in the flow thus measured correspond to the amount of materials being added (or lost) within a given depth interval. Typically, such measurements are made with a "spinner" tool in which the RPM of a rotating impeller mounted on the tool indicates the rate of flow past the tool. Such systems are subject to several sources of error. First, the fluid flow through the impeller region of the tool may not be representative of the fluid flow through the casing as a whole. Secondly, mechanical fouling of the impeller and friction effects due to moving parts may cause erroneous readings. Finally, the impeller, at best, measures the rate of fluid flow past the tool. If the rate that the tool moves through the casing should vary, as if the tool sticks and is subsequently freed, errors will occur in interpreting the spinner data in terms of well flow.

The above problems may be solved in accordance with the present application by the use of a tool which incorporates an ultrasonic flow measuring device. Ultrasonic flow meters for determination of fluid flow velocity within a conduit are well known, but so far as Applicant is aware, have not been adapted to the measurement of variation in fluid flow rate with depth in a well. For example, as described in British Pat. No. 2,061,510, a determination is made of the difference in transit time between ultrasonic pulses transmitted upstream between a pair of transducers and transmitted downstream between them. The transducers are located on the wall of the casing in a fixed position. French Pat. No. 2,472,755 is another example of similar apparatus. British Pat. No. 2,066,466 describes the ultrasonic measurement of fluid velocity in a pipe by comparing the phase of transmitted and received signals on opposite sides of the pipe. U.S. Pat. No. 4,295,378 relates to the measurement of media flow in a pipe by the doppler frequency shift technique.

It is an object of this invention to provide an improved method and apparatus for measuring flow rate through various perforated intervals of a well which utilizes ultrasonic energy.

It is a further object of this invention to provide such a method and apparatus which further utilizes a doppler sonic flow measurement technique.

It is yet a further object of this invention to provide a method and apparatus of the character described which provides increased reliability and accuracy through elimination of moving parts.

BRIEF SUMMARY OF THE INVENTION

In accordance with a preferred embodiment of this invention, a borehole tool is provided with a sonde configured with an ultrasonic signal transmitter and two compatible receivers equally spaced apart from such transmitter on opposite sides thereof. A pulse mode ultrasonic signal is propagated in opposite directions from the transmitter through the borehole fluid. The fluid velocity is calculable as a function of the difference in travel time between the transmitter and each of the two receivers. If the ultrasonic transmission is in a CW mode, fluid velocity is a function of the phase difference of the signal detected at the two receivers. In order to eliminate error associated with variations in tool velocity, the rate of movement of the tool relative to the borehole wall may be measured by doppler reflection or by observation of ultrasonic signals transmitted refractively through the casing.

DETAILED DESCRIPTION OF THE INVENTION

Figure 1:
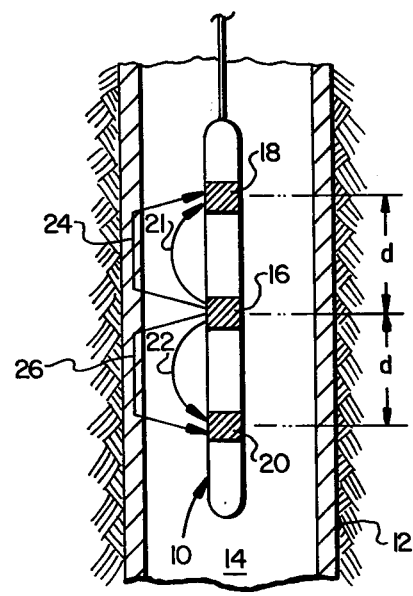
FIG. 1 is a diagrammatic illustration of ultrasonic transducer placement on a borehole tool situated within a well casing in accordance with a preferred embodiment of this invention.

In FIG. 1 there is shown a moveable borehole tool 10 situated within a well casing 12 containing moving fluid 14. Borehole tool 10 carries an ultrasonic signal transmitter 16 and a pair of ultrasonic signal receivers 18 and 20 longitudinally spaced equidistant from transmitter 16 on opposite sides thereof.

In operation, an ultrasonic pulse from transmitter 16 is propagated through fluid 14 in upstream and downstream directions along paths 21 and 22, respectively, and detected by receivers 18 and 20. Travel time of such an ultrasonic pulse from transmitter 16 to each of receivers 18 and 20 may be expressed as follows:

$$t_1 = \frac{d}{(V+C)} \quad t_2 = \frac{d}{(C-V)},$$

where
V = velocity of fluid 14 relative to tool 10
C = acoustic velocity of borehole fluid 14
d = spacing between transmitter 16 and either of receivers 18 or 20
$t_1$ = traveltime to receiver 18
$t_2$ = traveltime to receiver 20

Since $t_1$ and $t_2$ may be observed by conventional means, V may be calculated by combining the above equations to yield:

$$V = \frac{d}{2}\left(\frac{1}{t_1} - \frac{1}{t_2}\right)$$

Alternatively, if the transmitter 10 is excited with a CW oscillation:

$$T(t) = A_o \cos \omega t$$

The corresponding signals detected at the receivers are then:

$$R_1(t) = A_1 \cos \omega \left(t - \frac{d}{V+C}\right)$$

-continued $$R_2(t) = A_2 \cos \omega \left( t - \frac{d}{C-V} \right)$$

The phase difference between $R_1$ and $R_2$ is:

$$\Delta \theta = \frac{2dV}{C^2 - V^2}$$

Therefore, V may be calculated as a function of acoustic velocity, C.

It is clear that a sonde as described above will disturb the fluid flow through the borehole less than an impeller sonde and that it will determine a velocity averaged over a more representative part of a borehole cross-sectional area. The elimination of moving parts will also provide increased reliability and accuracy.

In order to solve the problem of variations in the relative velocity of the tool 10 and the casing 12, several approaches may be taken. The ultrasonic signal reflected from the casing 10 may be observed and the velocity calculated from the doppler shift between the frequency of the transmitted and detected signals. The same transmitter pulse used for fluid travel time measurements as described above may be used, or a separate transmitter or pulse shape may be used in order to optimize pulse characteristics for the doppler measurement. Refracted waves through casing 12 illustrated as waves 24 and 26 in FIG. 1 may also be detected, and a velocity calculated in a manner similar to that used to calculate the velocity of fluid 14 past tool 10.

Figure 2:
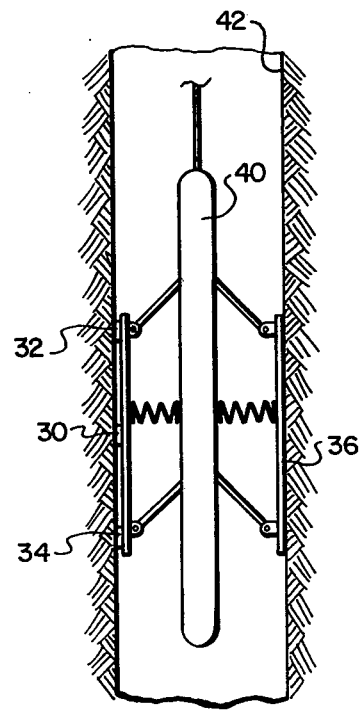
FIG. 2 is a diagrammatic illustration of pad-type transducers carried on a borehole tool within a well casing in accordance with an alternate embodiment of this invention.

In order to aid in the separation of energy travelling through the fluid 14 and through casing 12, separate pad-type transmitter and associated receivers may be used for the casing measurements. As shown in FIG. 2, a pad-type transmitter 30 and adjacent pad-type receivers 32 and 34 are carried on spring-loaded centralizer 36 mounted on tool 10. In this arrangement, sufficiently high frequencies in the megahertz range may be used so that noise associated with the motion of the pads along casing 42 will be out of the band of interest. For simplicity, the transmitter and receivers for measurement of fluid travel time in opposite directions have been omitted from FIG. 2.

It is clear that once the relative velocities between tool 10 and fluid 14 and between tool 10 and casing 12 in FIG. 1 are known, the calculation of the desired parameter, i.e., the velocity of fluid 14 through the borehole, may be determined in a straightforward fashion. The same is, of course, true for the alternate embodiment of FIG. 2.

The invention of this application comprises not only an apparatus in accordance with the above description, but also the method practiced thereby. Broadly speaking, this constitutes a method of calculating the rate of fluid flow in a borehole at various depths, comprising the steps of propagating ultrasonic signals from a transmitting transducer located on a borehole tool through the borehole fluid in upstream and downstream directions, respectively, and detecting the signals by means of a pair of separate receiving transducers also located on the tool equidistantly positioned respectively above and below the transmitting transducer at equally spaced intervals, the velocity of the fluid being calculated as a function of the respective travel times of the upstream and downstream signals.

What is claimed is:

1. An ultrasonic flow meter for determining the rate of fluid flow at various depths in intervals of a borehole comprising:
   (a) a tool moveable within said borehole;
   (b) an ultrasonic signal transmitter mounted on said tool;
   (c) a pair of ultrasonic signal receivers mounted on said tool and longitudinally spaced equidistant from said transmitter on opposite sides thereof;
   (d) means for energizing said transmitter in a pulse mode, the difference in travel time of the resultant signal propagating through the borehole fluid between the transmitter and each of the two receivers, respectively, constituting a measure of fluid velocity relative to said tool; and
   (e) means for calculating the relative velocity of the tool and the borehole casing by detecting the doppler shift between the frequency of the transmitted signal and the signal detected at either receiver after reflection from said casing.

2. An ultrasonic flow meter for determining the rate of fluid flow at various depths in intervals of a borehole comprising:
   (a) a tool moveable within said borehole;
   (b) an ultrasonic signal transmitter mounted on said tool;
   (c) a pair of ultrasonic signal receivers mounted on said tool and longitudinally spaced equidistant from said transmitter on opposite sides thereof;
   (d) means for energizing said transmitter in a pulse mode, the difference in travel time of the resultant signal propagating through the borehole fluid between the transmitter and each of the two receivers, respectively, constituting a measure of fluid velocity relative to said tool;
   (e) means for calculating the relative velocity of the tool and the borehole casing comprising means carried with said tool for transmitting an ultrasonic wave from said tool so as to be refracted through said borehole casing in upstream and downstream directions respectively; and
   (f) means carried with said tool for thereafter detecting said refracted signal at two locations spaced longitudinally from the point of said transmission on opposite sides thereof.

3. Apparatus as in claim 2 wherein said measuring means comprises a pad-type transmitter carried with said tool in contact with said casing and a pair of pad-type receivers also carried with said tool on opposite sides of said pad-type transmitter in contact with said casing.

4. The method of calculating the rate of fluid flow in a borehole comprising:
   (a) propagating an ultrasonic signal in a pulse mode from a transmitter located on said tool through said borehole fluid in upstream and downstream directions respectively;
   (b) detecting said signal by a pair of receiving means located on said tool spaced longitudinally above and below said transmitter equidistant therefrom;
   (c) calculating the relative velocity of said fluid in said borehole as a function of the travel times of said signal between said transmitter and said receiving means;

(d) determining the relative velocity of said tool and said borehole casing by doppler reflection; and (e) combining said relative velocities arithmetically to obtain a true rate of fluid flow in said borehole.

5. The method of claim 4 wherein said tool is moved through various intervals of said borehole as said signal is propagated.

6. The method of calculating the rate of fluid flow in a borehole comprising:

(a) propagating an ultrasonic signal in a CW mode from a transmitter located on said tool through said borehole fluid in upstream and downstream directions respectively;

(b) detecting said signal by a pair of receiving means located on said tool spaced longitudinally above and below said transmitter equidistant therefrom;

(c) calculating the relative velocity of said fluid in said borehole as a function of the phase difference of said signal between said transmitter and said receiving means;

(d) determining the relative velocity of said tool and said borehole casing by doppler reflection; and (e) combining said relative velocities arithmetically to obtain a true rate of fluid flow in said borehole.

* * * * *